United States Patent [19]

Ledebuhr et al.

[11] Patent Number: 4,519,191
[45] Date of Patent: May 28, 1985

[54] STRAWBERRY HARVESTER AND PROCEDURES FOR GROWING AND HARVESTING OF SUCH FRUIT

[75] Inventors: Richard L. Ledebuhr, Haslett; Clarence M. Hansen, East Lansing, both of Mich.

[73] Assignee: Board of Trustees of Michigan State Univ., East Lansing, Mich.

[21] Appl. No.: 587,041

[22] Filed: Mar. 7, 1984

[51] Int. Cl.³ ............................................ A01D 46/00
[52] U.S. Cl. ...................................... 56/331; 56/16.5; 56/330; 56/DIG. 2
[58] Field of Search ............ 56/331, 330, 327 R, 56/16.5, DIG. 2, 12.8; 171/41, 42

[56] References Cited

U.S. PATENT DOCUMENTS

| | | | |
|---|---|---|---|
| 3,163,234 | 12/1964 | Boyer | 171/42 |
| 3,389,542 | 6/1968 | Rasmussen | 56/331 |
| 3,521,438 | 7/1970 | Adrian | 56/330 |
| 3,530,651 | 9/1970 | Rounsville | 56/330 |
| 3,596,456 | 8/1971 | Quick | 56/330 |
| 3,623,309 | 11/1971 | Stang et al. | 56/330 |
| 3,698,171 | 10/1972 | Hecht | 56/331 |
| 3,704,576 | 12/1972 | Quick | 56/330 |
| 3,720,051 | 3/1973 | Quick | 56/330 |
| 3,797,503 | 3/1974 | Dentant | 130/30 R |
| 3,921,375 | 11/1975 | Cetrulo, Jr. | 56/327 R |

OTHER PUBLICATIONS

"Solid Bed Planting", pp. 15–22, (Report Hort. Res. Institute of Ontario) 1967, by C. L. Ricketson.
"Our Experiences with Mechanical Harvesting of Strawberries", pp. 128–132 (110th Ann. Report, State Hort. Soc. of Michigan), 1980, by J. R. Grant.

Primary Examiner—Jay N. Eskovitz
Attorney, Agent, or Firm—Miller, Morriss & Pappas

[57] ABSTRACT

A process and apparatus applicable to solid-set fruit growth such as strawberries in which a single harvest applies to an entire solid-set field and the harvest does not destroy the plants but separates foliage and trash from the fruit in an aerodynamic sequence and subsequent singulation of the fruit occurs under conditions of aerodynamic levitation of the fruits and clusters at the point of cropping connective tendrils.

5 Claims, 9 Drawing Figures

FIG. 1

A. PRE-GROWING

SITE SELECTION - WELL DRAINED - LEVEL
SOIL TYPE - SANDY LOAM
LEVELING - FLAT SURFACE
FUMIGATION
COVER CROPPING AND WEED CONTROL
CONTACT HERBICIDES - KILL COVER CROP

B. PLANT SELECTION - PLANTING EXAMPLE MIDWAY II
DENSITY - HIGH TYPE CHARACTERISTICS

C. TRANSPLANT TO SOLID SET IN
SOLID SET FIELD - NO ADDED TILLAGE

D. GROWING

WEED CONTROL - MANUAL OR CHEMICAL
MOISTURE CONTROL - IRRIGATION
FERTILIZERS
FUNGICIDES

E. HARVESTING

LIFT AND CUT ABOUT 5/8" ABOVE GROUND
(ABOVE CROWN) MOVE ONTO CONVEYOR LIFTS
FOR INITIAL AERODYNAMIC SEPARATION.
AERODYNAMIC ERECTION TO SHEAR AWAY STEMS
DEBRIS EXITS - DIVERSION OF FRUIT TO
COLLECTION OR PROCESSING

F. ROLLING
EVERY SPRING WHEN FROST LEAVES GROUND
FACILITATES FERTILIZER & FUNGICIDE ACCESS

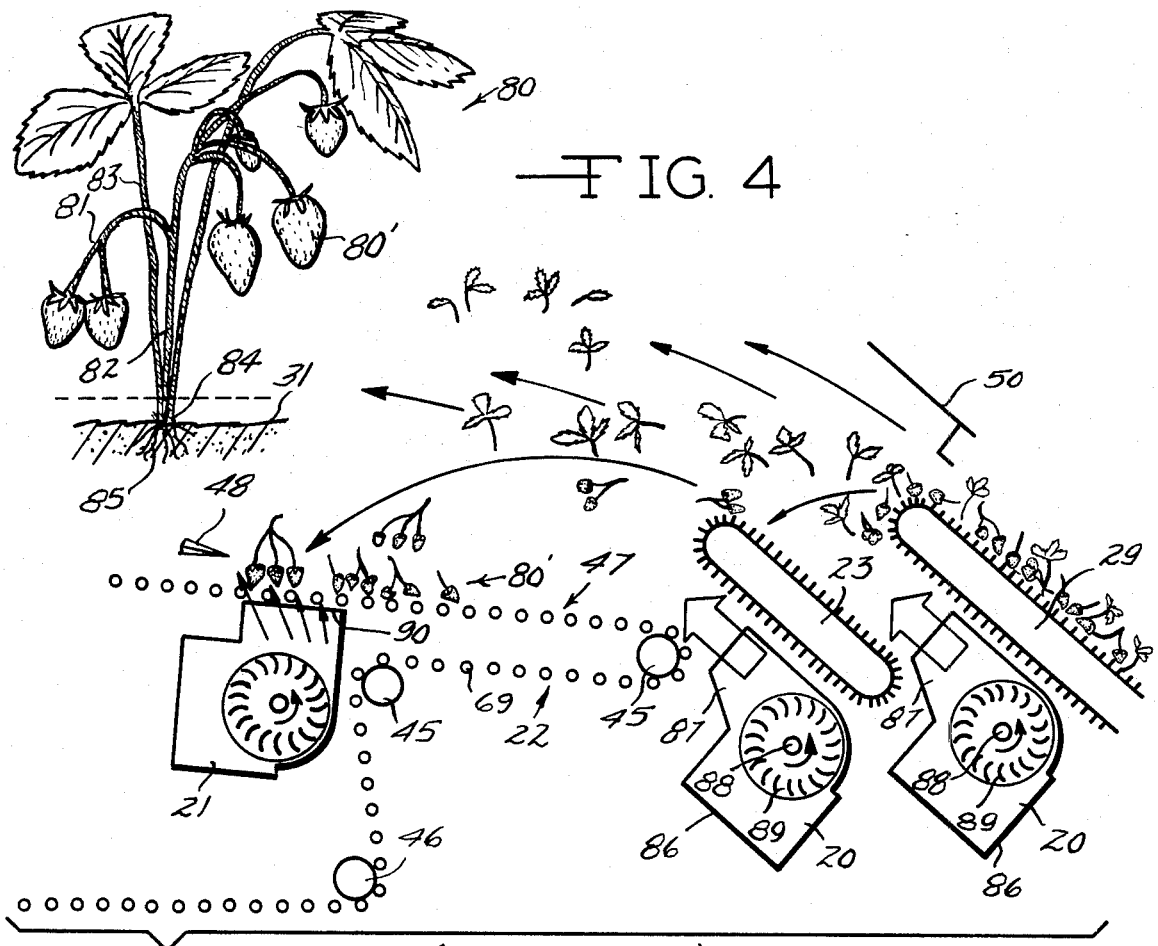
FIG. 4
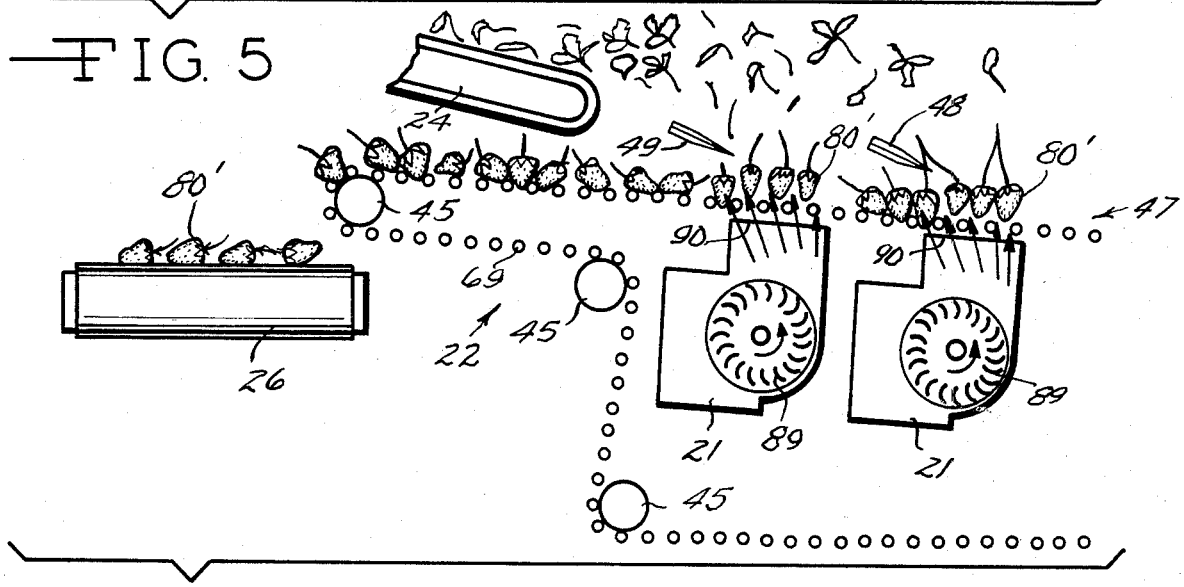
FIG. 5
FIG. 6

STRAWBERRY HARVESTER AND PROCEDURES FOR GROWING AND HARVESTING OF SUCH FRUIT

The present invention relates to a strawberry harvester and to a process for growing and harvesting strawberries in which the opportunity for maximization of yield is realized and the harvesters and process for harvesting is substantially automated with attendant economy and consequent improvement in efficiency.

The fragile character of strawberries has caused these berries to be grown usually in rows with requirements to elevate the fruit from contact with the ground and to provide adjacent access for cultivation, tilling, application of herbicides and fungicides, application of fertilizers and irrigation and, finally, nondestructive access to the plants by pickers who address the harvesting with all of the limitations of hand locating, picking, transporting, sorting and packing. Attempts to automate the picking or harvesting of strawberries have been frustrated by the row orientation of the plants, by the access limitations imposed on equipment by the rows and by the inexactitude of the time for harvest, as well as by the fragile nature of the berries. In general, several pickings have been required seeking to harvest the strawberries at the point of ideal color, flavor and size and without destructive crushing trauma to the fruit.

To make worthwhile the development of an automated strawberry harvester, it was necessary to devise a high yield procedure for growing strawberries that would assure a profit against a substantially expensive capital investment in the mechanical harvester.

Accordingly there was develeoped a process for growing strawberries quite unlike known procedures; a process for harvesting the strawberries produced in accord with the conditions established by the growing procedures; and finally an apparatus allowing optimum picking yields from a harvesting procedure which goes over the fields in a single pass and without resort to the use of rows in prevention of berry damage.

The objects of the present invention were to present the foregoing processes and the apparatus for exploitation of the process and apparatus.

Another object is to provide an aerodynamic approach first to the separation of trash and foliage from fruit and then to the levitation of the strawberry fruit for an instant of physical separation of fruit from the peduncle connection and thereby simultaneously freeing a total crop at all stages of maturation in the plants.

Another object is to achieve the foregoing objects while avoiding crushing or destruction of the fruit and plants by the harvesting means.

Other objects including the substantial elimination of manual attention to the harvesting and the consequent economic advantage of an efficient apparatus and procedures will be apparent to those reasonably skilled in the art of strawberry harvesting and growing as the description proceeds.

BACKGROUND OF THE INVENTION

Most picking or harvesting of strawberries has been by hand and row planting of berries has been the usual manner of growing this fruit. It is natural that most harvesting apparatus has sought to accomplish harvesting by coursing up and down the rows and moving the row crops in a manner generally simulating the picking of strawberries by hand. Exemplary harvesting devices are seen in the work of C. E. Rasmussen, U.S. Pat. No. 3,389,542; Graeme R. Quick, U.S. Pat. Nos. 3,596,456 and 3,704,576; Charles L. Hecht in U.S. Pat. No. 3,698,171; and in the work of J. J. Adrian in U.S. Pat. No. 3,521,438. While some of these known prior references proposed selected removal of fruit, several proposed cutting the plants at a level beneath the foliage and then achieving some form of gentle separation. In Hecht a sickle bar spaced with picking fingers and assisted by a leafer belt proposed a cut about one and one-half inches above the soil and defoliation was achieved with an upper suction structure and a lower registering blower structure.

In a very general way, the Cluster Breaker of W. G. A. Dentant, et al, U.S. Pat. No. 3,797,503, describes a device for harvesting pod plants which tend to cluster utilizing aerodynamic separation as between plural conveyor runs.

None of these references are believed to show or suggest the apparatus of the present invention and none of the references suggest a harvester applicable to solid-set strawberry fields or suggest that such a growing procedure is beneficial.

Solid-set growth of strawberries was suggested by C. L. Ricketson, 1967 *Solid Bed Planting* (Report Hort. Res. Institute of Ontario), pp. 15–22 and this suggestion for higher yields and a harvester therefor was confirmed by the work of J. R. Grant, 1980 *Our Experiences with Mechanical Harvesting of Strawberries,* 110th Ann. Report, State Hort. Soc. of Michigan, pp. 128–132. Solid-set culture has since been viewed as the key to making mechanical harvesting feasible. Solid-set culture of strawberries is contrasted with row culture in that the growing fields are filled with closely grown plants so that the growth is predominantly upward and that the leaves, stems and tendrils elevate and support the blossoms and fruit from encounter with the ground. This substantially eliminates exposure of fruit to the ground and provides sufficient support for mowing and handling with separation of debris from the fruit and separation or singulation of fruit from the main stem or peduncle as the harvesting proceeds.

To maximize the harvest, the ground requires preconditioning and appropriate treatment and then the crops can be planted and annually harvested. The plants are not destroyed and fertilizers, insecticides, herbicides, fungicides, and irrigation, for example, are easily achieved in good season and the tight, solid-set culture closes ranks against weed and pest intrusions. No constant-attention cultivation is required and the consequent yields exceed even the suggestion of early advocates of solid-set strawberry culture.

GENERAL DESCRIPTION

Preparation and Growing

In general, the preferred solid-set strawberry culture of the present invention involves: A. A pregrowth site selection and beneficiation by preparation of the land in a suitable soil type by fumigation, draining and weed controlled with cover cropping followed by a herbicide application eradicating the cover crop and this requires about one year to achieve; B. Hardy strawberry plants such as known by the designation "Midway II" are selected for high density capability, good yields, vertical growth characteristics, and high runner production; C. The plants are transplanted in a high density pattern or interval to achieve a solid-set field without additional tillage, growth is permitted with suitable weed control only as necessary and with moisture control by irrigation. Fertilizers and fungicides may be applied during growth and early spring frost control measures, as necessary, are taken. The establishment of the plants requires one year after the completion of the preground site preparation; D. Harvesting commences in the third year by lifting the total plant while mowing it above the crown and cutting to achieve a physical separation between fruit stems and leaf stems without damage to the plant. Then, in a progressively gentle manner, the trash and debris are discarded and the fruit is aerodynamically projected to meet subsequent aerodynamic levitation and erection for shearing of connected tendrils and the debris from that shearing is discarded and the fruit thus aerodynamically singulated and clipped achieves diversion to collection or subsequent grading, sizing and processing; and E. The ground and plants surviving the winter are rolled as the frost leaves the ground. This prepares the ground to take machinery as is required for fertilization and application of fungicides. Annually, after planting, rolling of the solid-set field should precede the annual growth period.

Apparatus

The apparatus comprises a platform chassis on driven and steerable wheels and the engine for the apparatus is located on the platform. The engine drives shafting, and by means of drive belts therefrom, four coordinated blowers extending for the width of the harvester bed provide aerodynamic foliage separating and fruit levitation power as required. The blowers which extend across and under the conveyors are oriented to complement the conveyor flow and function between and through the conveyors. Plural conveyors moving the harvest from the front to the rear of the harvester are hydraulically driven from motors served by a pump driven by the engine and a Hume type reel and all double-bladed hedgers are also hydraulically powered. Hydraulic power derived from the engine powered pump drives the entire harvester structure and the hydraulic circuitry is controlled at a control panel in front of a driver's seat where steering is also managed. The selection of hydraulic actuation for most of the powered components in the harvesting apparatus is preferred because this provides an easy flexibility of location, performance and remote control from a single operator station if desired. The front of the strawberry harvester structure supports the operating Hume type reel and the reel is backed by a ground skimming plurality of jointed elements together forming a shoe in support of the front mowing hedger at an operating elevation above the level surface of the land at about five-eighths inches and clearing the crown of the solid-set plants. At mowing or shearing, the plants, foliage and fruit are gently lifted and swept rearwardly and up on the first gently elevating conveyor flight. The reel, the lifter shoe and hedger, and the first conveyor, are poised by an air cylinder to pivot from the rearmost drive axis of the first conveyor. This allows the front portion of the harvester to be poised at a selected sensitivity in prevention of diving and bobbing and in prevention of damage to the plants it is clipping. The sheared plants (leaves, tendrils, debris and peduncle on clusters of attached fruit) are passed upwardly on the open flight second conveyor and into the housing cover or wrapper of the harvester. The second conveyor is selectively and pivotally movable at one end toward and away from the chassis which allows the operator to elevate all of the apparatus forwardly of the upper pivot of the second conveyor. As the second conveyor rolls over on its endless track to the top of its course, the leaves, debris and fruit are dumped and tumble into an airstream functioning between the second conveyor and a third lower parallel short flight endless conveyor The first airstream whips off the great majority of leaves and debris and this flows upward and into the entraining airstream and through the tunnel formed between hood and an endless discharge conveyor assisting exit of debris from the harvester. The higher specific gravity fruits, substantially separated from the leaves and trash, are gently projected and air lifted in a trajectory over the third conveyor unless their tendrils are entangled with clumps of damp debris. In the latter case, the third and short flight conveyor gently receives the deposited clusters and as the third conveyor is moving it drops the collected and separated debris over the top of its flight and rearwardly of the apparatus into a second airstream generally parallel to the first airstream and the second airstream is generated by a blower located between the (third) short conveyor extending substantially across the conveyor. This second air blast complements the first in projecting fruit and attached fruit stems in a continuing trajectory to a gentle landing on a generally horizontal endless conveyor. Additional trash and debris is urged up and out of the harvested berries in their trajectories toward landing on the horizontal conveyor. The added trash follows the earlier flow in the tunnel chamber above the conveyor banks and beneath the harvester hood or cover. This type of separation is achieved because the low specific gravity and high surface area of the trash and leaves permits them to be blown clear of the fruit and fruit clusters into the stream of exiting rubbish. The higher specific gravity and more compact fruit and stems are projected in a different path and aerodynamically propelled and lowered onto the horizontal conveyor by the trajectory from the short flight conveyor and the flanking complementary blowers. These fruits, clusters and connecting stems all progress rearwardly on a rod-like foraminous floor of the endless horizontal conveyor. The rods run across the conveyor and are supported by roller chain link structures at spaced-apart intervals and the outer roller chain elements idle on or are driven by sprockets. The rods thus form spaced-apart axes for the chain links. The horizontal conveyor receives the rearwardly projected fruit from the spent trajectory and complementary air blasts of both the first and second blowers aimed between the rising conveyor flights in an upwardly and rearwardly directed orientation. The landing of the fruit, connected tendrils, peduncle and stems occurs in a gentle tumbling encounter with the horizontal rods on the moving platform. These move on the horizontal conveyor rearwardly and over two spaced-apart blowers, designated third and fourth blowers, located immediately beneath the bed of the horizontal conveyor. A pair of spaced-apart double-bladed shears, called hedgers, are positioned one above and slightly rearwardly of each of the third and fourth blowers. By using hedgers in which both blades are moving, debris build-up on top of the blade of the hedgers is avoided. These hedgers are hydraulically driven and are shaped to shear the tendrils and peduncles as the berries are levitated and erected into the shearing blades. At shearing, the nonturbulent and controlled vector aerodynamics are changed and the "lift" for the fruit is lost and the berries return or drop to the moving platform of the horizontal conveyor. This levitation occurs at each of the double-bladed shears and the amount of levitation adjusts the stem, tendrils and peduncles into the shears. When the stems, tendrils and peduncles are shorn, the berries rest substantially in contact with the moving horizontal conveyor. The clipped berries continue rearward movement on the horizontal rod conveyor in ungraded condition and exit from the horizontal conveyor to an unloading point as via a lower transverse conveyor for subsequent collection, grading and processing.

The actual yield in berries in all stages of ripeness are uniformly in the 80 to 90 percent category referenced to a theoretical yield of 100 percent and this is achieved in the single cropping by the harvester described and based upon field tests of the harvester travelling at an average speed of 1.9 kilometers per hour.

IN THE DRAWINGS

FIG. 1 is a schematic flow diagram indicating the pregrowth procedures over two years, the plant selection for best results, the transplant to solid-set in the second year, the growth, the harvesting in the third year, and the rolling which is repeated every spring across the solid-set field.

FIG. 3A is an enlarged plan view fragmental drawing showing the structure of the double-bladed shears or hedgers as used in mowing and in singulation.

FIG. 4 is a somewhat schematic side elevation view of the stawberry plant of the type considered for solid-set growth and harvesting and indicates leaf, stems, peduncles, fruit clusters and connective tendrils growing generally vertically.

FIG. 5 is a schematic side elevation view of the separation procedures occurring within the harvester in stripping away debris from fruit clusters, the establishment of debris and fruit trajectories, and then indicating the shearing of stems and singulation of fruit under aerodynamic support.

FIG. 6 is an extension of the schematic side elevation view of FIG. 5 and elaborating on the aerodynamic process occurring by reason of the air columns through the rod-like floor of the horizontal conveyor and through the two spaced-apart double-bladed shears or hedgers above the conveyor floor and each shear acting on levitated and aerodynamically oriented fruit as impacted by the blasts of the last two blowers in the apparatus of the present invention.

Figure 7:
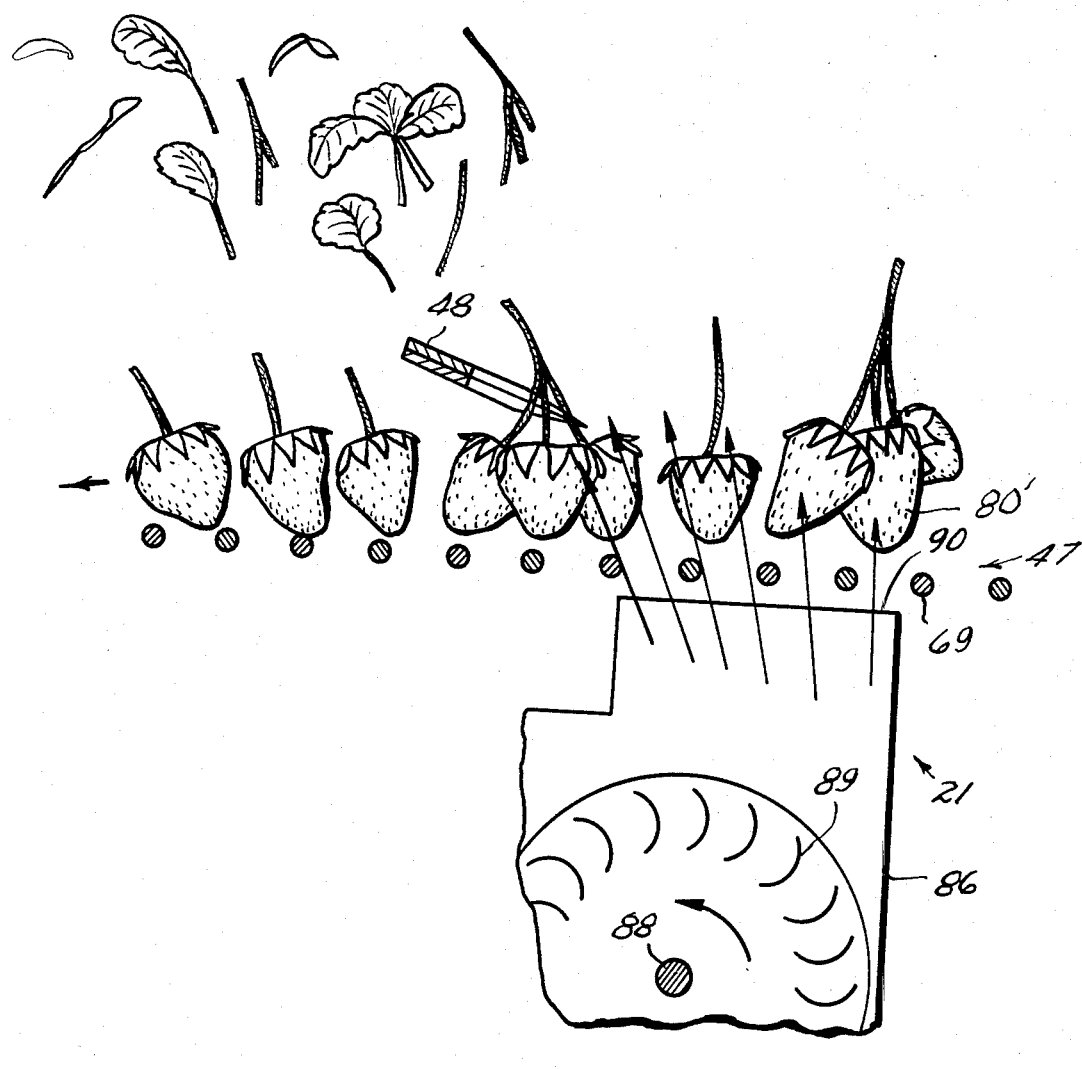

FIG. 7 is an enlarged schematic side elevation fragment indicating levitation of the fruit preliminary to and at shearing and then indicating the aerodynamic drop to the conveyor surface after singulation.

Figure 8:
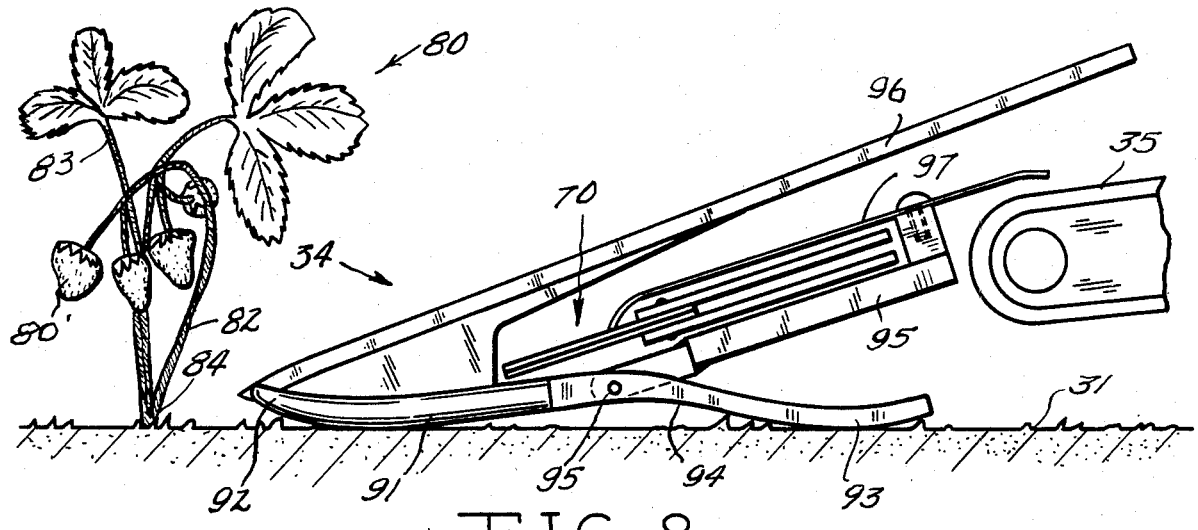

FIG. 8 is a side elevation view of the lifter shoe in ground contact and carrying the mowing double-edged shear or hedger and oriented to clip the vertically oriented fruit plants above the crown and with the lifters or skid bars and flow cover plates extending rearwardly over the first conveyor.

SPECIFIC DESCRIPTION

Referring to the drawings and with first specificity to the FIG. 1, the apparatus of the invention is best understood by appreciating its role in extending and improving a total procedure for growing and harvesting solid-set fruit and in which two years of preparation are required for the first harvest. Thereafter, annual yields are anticipated subject to necessary grooming, rolling, irrigating and fertilization as required. The procedures are made practical by the harvesting apparatus and procedures of the present invention.

In the pregrowing period A, a site must be selected which is level, well drained and preferably of a sandy loam type soil. Mechanical grooming may be required to remove stones and to achieve a smooth and level, even-textured surface. Soil preparation, then, involves a building of organic level, fertilization, fumigation and cover cropping with adequate weed control. Using contact herbicides, the cover crop is killed preparatory to the selection and planting of the fruit plants on the soil in the second year.

Plant selection B looks for hardy plants sustaining high density growth and having vertical growth characteristics. Plants well known in the strawberry culture, as Midway II, have these desirable features and grow well under dense cultivation and the blossoms and fruit reach vertically for the most part. Midway II is the preferred plant. It is hardy, reasonably resistant to disease and fungus and the foliage stifles weed growth when properly maintained and groomed.

These plants are transplanted C and set in a solid-set grid pattern with a set field irrigation system on about 24 inch centers and irrigation follows the planting. No added tillage is required and during growing D weed control is exercised, where required, using both manual and chemical means and irrigation is continued as needed. Fertilizers and fungicides can also be applied and a convenient means of access is to establish non-planted roadways through the solid-set fields at intervals within the range of field spray apparatus. This avoids physical interference with growth of the plants.

The plants, thus set and minimally tended, are ready in the following year (third) for the first and successive annual harvesting E.

The harvester of the present invention enters the growing field at a time of maximum ripeness of the great majority of the fruit. The harvester rolls on floatation or dual wheels providing minimum trauma in movement over the fields and cuts a swath substantially equal in width to the width of the mowing shears of the harvester. The shears are double-bladed and cut off the plants at about five-eighths inches above the ground or just above the crown of the plants. A ground sensing shoe moving with the shears establishes the interval up from the level ground and the mowed plants are lifted and delivered onto a substantially horizontal endless conveyor behind the shears and shoe. Movement of sheared plants onto the first conveyor is assisted by a front sweeping device such as a Hume type reel which gently lifts and urges the plants and fruits through the shears, over the guide bars of the shoes, and onto the first conveyor. The first conveyor transports the sheared material rearwardly to a second driven endless conveyor. This second conveyor is flighted and lifts the mowed fruits and debris upward and rearward and into the cover or cowl of the harvester and into a series of two successive air blasts forming a first aerodynamic separation between fruited stems and leaves or other disassociated debris. A first trajectory established by the air blasts strips away the leaves and light materials and a second trajectory also established by the air blasts is formed which deposits the fruit and connective tendrils and peduncles gently onto a powered substantially horizontal bedded moving endless conveyor, the path of which forms an openwork table onto which the fruit and connective materials fall. A second aerodynamic exposure with levitation and erection of the fruits occurs as the fruits move along the path of the horizontal conveyor. The air blasts are two in number through the conveyor table in a direction complementing the flow of fruit and the fruits are moved into double-bladed operating shears or hedgers. The hedgers crop away the connective tendrils and peduncles and singulate fruits in all stages of maturation about two centimeters above the cap of the fruit. At shearing, the nonturbulent and controlled vector aerodynamics change and the fruit, momentarily elevated, falls since the source of its lift (airflow, configuration, specific gravity and attachments) are altered by the cropping away of the connective stems and tendrils. The singulated and cropped fruit drops to the moving conveyor bed or table and is delivered rearwardly to a lower cross conveyor which accepts all of the fruit product and conducts it to gathering means, not a part of the present invention. The sheared or cropped tendril fragments and peduncles are blown free of the fruit and enter the discharge tunnel, aided by a final endless conveyor to discharge onto the fields or otherwise, as desired. Thus, the harvester accomplishes a diversion of fruit for collection and processing from the harvest and exiting debris.

Figure 2:
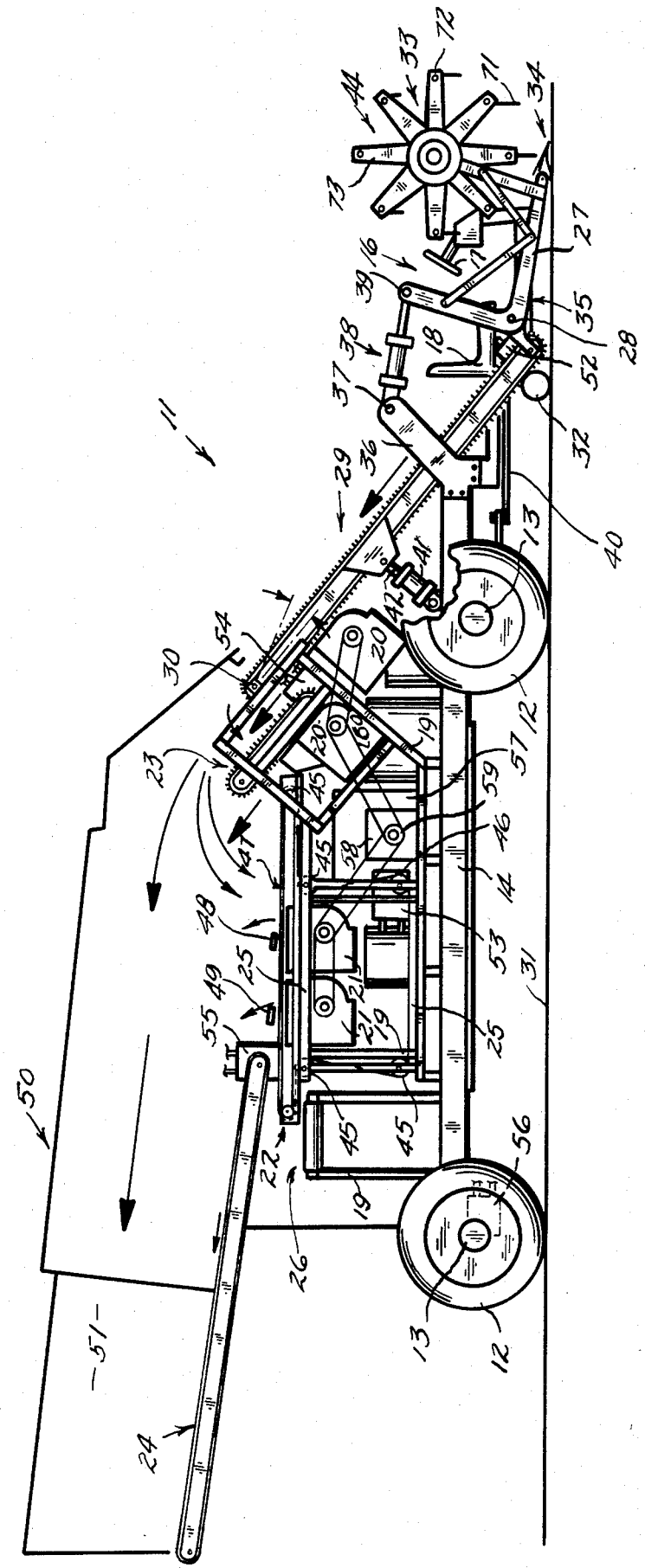
FIG. 2 is a side elevation view of the harvester of the present invention and with the hood or cover cut away and with portions of one wheel cut away to indicate structural relationship of the apparatus to the chassis.

In FIG. 2 the structure of the harvester 11 is best appreciated. The harvester 11 rolls on wheels 12 and axles 13 for the wheels 12 and support is by a box-like chassis 14 and the chassis 14 supports the entire working portion of the harvester 11. The chassis 14 will be seen to include an extension or platform 15 (FIG. 3) and a driver station 16. At the station 16 is located a steering wheel 17 and well known hydraulic, pneumatic, and mechanical elements for controlling the drive and functioning of the harvester 11. An operator sitting on the seat 18 can steer the harvester 11 and control substantially all essential operations. The chassis 14 includes a plurality of vertical struts 19 which provide structural supports for two inclined forward blowers 20, for the conveyors after the first conveyor, for the two vertical rearward blowers 21 and for the rear endless horizontal conveyor 22 having an openwork bed and also the fixed-angle short flight endless conveyor 23. The trash or debris exit endless conveyor 24 is also supported by the chassis 14 and its vertical struts 19 with suitable horizontal supports as frame superstructure 25.

The small endless fruit delivery conveyor 26 is driven transversely across the harvester 11 receiving singulated fruit, as will be seen, and delivering it to the platform 15 for collection or further processing.

At the front of the harvester 11 is an L-frame 27 which is pivotally supported on an axis of the pivot 28. The pivot 28 of axis of L-frame 27 is supported by a large flighted endless conveyor 29. The conveyor 29 is pivoted at the top of its flight on the chassis 14 at pivot 30 and rides in contact with the ground 31 on its operably connected idling gage or ground sensing wheels 32.

The L-frame 27 operably supports a driven sweep 33 in the form of a Hume type reel, the hinged ground contacting shoe 34 and the first or front conveyor of the endless powered type 35. A pair of chassis extensions 36, one on each side of the conveyor 29, supports a transverse bar 37 and air cushion cylinder 38 extends therefrom into cushioning connected relation with the upper bar 39 of the L-shaped frame 27. In this manner the cylinder 38 selectively counterbalances or poises the shoe 34 to a ground contact sensitivity, as desired.

Beneath the chassis 14 and at the front of the harvester 11 can be seen the steering linkage 40 by means of which the wheels 12 can be turned from the drive station 18.

An hydraulic cylinder 41 is attached at one side to the chassis 14 and the piston 42 on the other side of the cylinder 41 is connected to a bracket 43 which is an extension of the frame portion of the conveyor 29. By extending the piston 42, the conveyor 29 can be pivoted on top pivot 30 to lift the conveyor 29 and connected front section 44 free of the ground 31 for rapid transport of the harvester 11 when harvesting is not proceeding.

Figure 3:
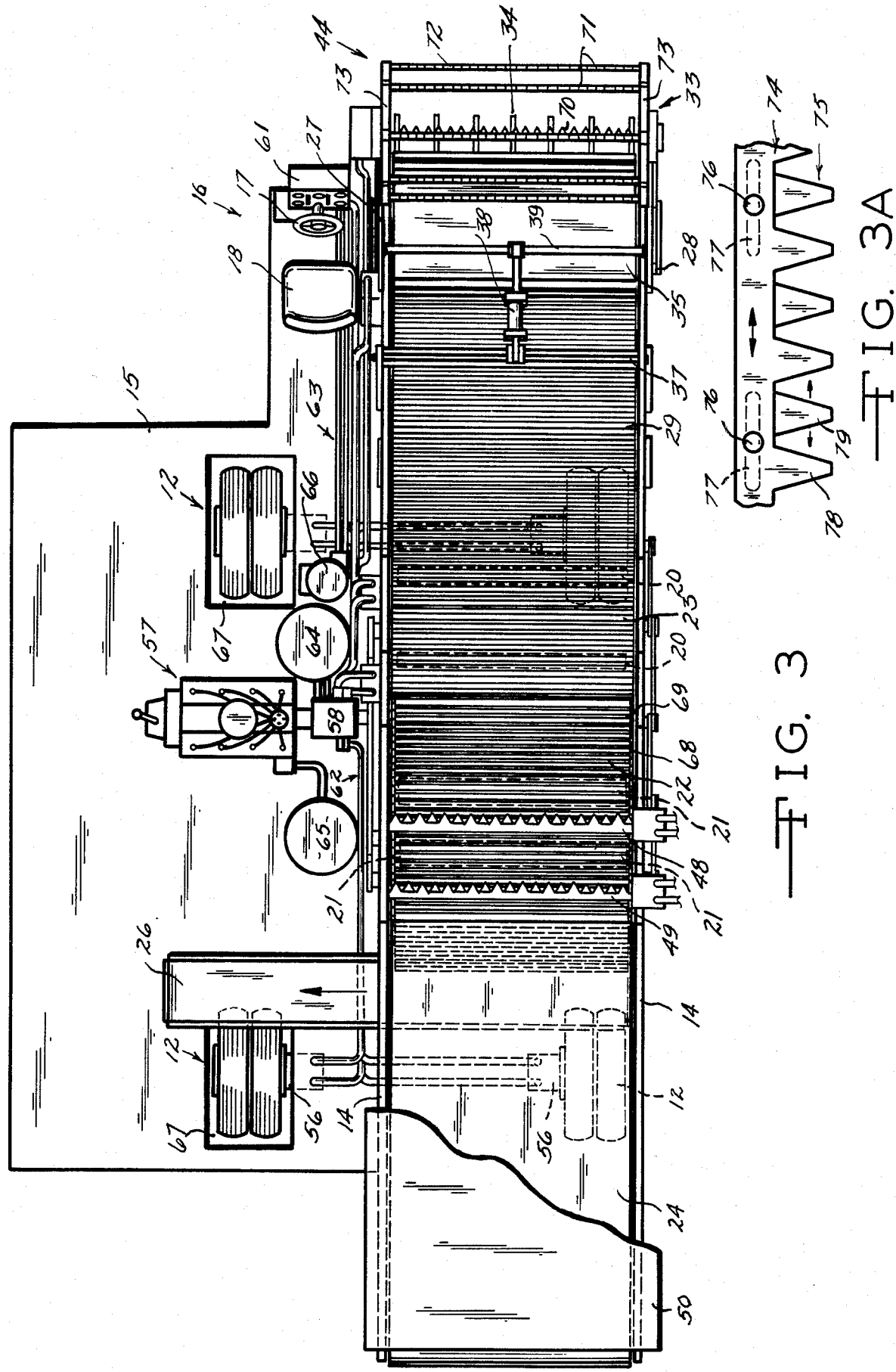
FIG. 3 is a top plan view of the harvester structure of FIG. 2 with the cover partially cut away and better illustrating the preferred embodiment with work platform, engine pumps and steering.

The front of the harvester 11, referenced to FIG. 2, is the end where the sweep 33 is seen over the ground contacting shoe 34 and the shoe 34 supports a power hedger or mowing bar of the double-bladed type (70 in FIG. 3). The material cut from the fields by the hedger 70 is urged rearwardly and upwardly by the shoe 34 and onto the first conveyor 35. The first conveyor 35 carries the materials rearwardly and dumps the materials onto the second conveyor 29 which is upwardly inclined and flighted. The material is elevated up and over the pivot 30 and then is dropped over a gap or space toward a third conveyor 23 which is a short, fixed and endless driven and flighted conveyor generally paralleling the second conveyor 29. At the upper end of the third and short conveyor 23 material impinged on the flights thereof is dropped onto or is propelled toward the fourth conveyor 22 which is substantially horizontal and the web or bed 47 of the fourth conveyor 22 comprises openwork and is preferably formed by spaced-apart parallel rods at intervals which support the small, immature fruits while permitting minimum restriction to airflow therethrough. The fourth conveyor 22 moves over idling wheels 45. Drive wheel or sprocket 46 acts on the endless flanking and intermediate chain in movable support of the rods, as will be seen, so that the vertical blowers 21 can be closely located adjacent to and beneath the moving horizontal upper surface 47 of the conveyor 22, as seen, and thereby effectively project an air blast therethrough ahead of and slightly against the transversely mounted double-bladed driven hedgers 48 and 49. The fifth conveyor 24 for exiting trash and debris forms with the hood or cover 50 an exhaust tunnel 51 through which blown debris is conducted rearwardly and outwardly of the harvester 11.

The four blowers in pairs 20 and 21 are identically structured and extend across the width of the harvester and the forward blowers 20 are at an inclined angle from vertical which strips leaves and debris from the material as harvested to fall in a tumbling drop motion which separates the fruit and fruit connected elements in a gravity influenced means in the trajectory toward a soft landing on the grill or openwork surface 47 of the fourth conveyor 22. The rearward two blowers 21 in spaced sequence beneath the surface 47 act on the fruit in an erecting and levitating manner, as will be seen, presenting the stems and peduncles of the fruit to the driven hedgers 48 and 49 for appropriate severance within about one inch of the fruit connection. The sixth endless driven conveyor 26 runs transversely across the harvester 11 receiving the singulated fruit discharged from the fifth conveyor 22.

The most flexible power means is used and all of the six conveyors are driven by hydraulic means allowing full adjustment with flexibility in speed and power. The hydraulic motors are 52, 53, 54, and 55 and are visible in the FIG. 2. The hydraulic motor 56 is seen in hidden edge line acting on the axle 13 or wheels 12 to drive the rear of wheels 12. The combustion engine 57 drives the hydraulic pump 58 and the shaft extension 59 drivably turns the flexible drive belts 60 and powers the blowers 20 and 21 at a common speed and torque.

In FIG. 3 the harvester 11 of FIG. 2 is given an extended dimension and the power plant of the combusion engine 57 is seen to flank the conveyor structure midway of the ends thereof so as to provide mechanical, hydraulic and pneumatic power as required throughout the harvester 11. The engine 57 is supported by the underlying chassis 14 and rests directly on the cantilevered side platform extension 15. The platform 15 also supports the driver station 16 at the front of the harvester 11 and the controls 61, the latter generally within operative reach of a driver in seat 18 adjacent the steering wheel 17. This arrangement also provides convenient location of all hydraulic 62 and pneumatic lines 63 serving the hydraulic motors and air cylinders as required. The hydraulic pump 58 is directly coupled to the engine 57. The hydraulic fluid tank 64 supplies the pump 58 and receives return fluid. Fuel for the engine 57 is contained in tank 65 and the compressed air tank 69 provides adequate air either via a compressor or by a pneumatic charge. The platform 15 may also carry harvested fruit as delivered from the fruit delivery conveyor 26 (sixth from the front of harvester 11). The platform 15, cantilevered from the chassis 14, is kept low by allowing the wheels 12 to project upwardly through the openings 67. The wheels 12 are preferably floatation or duals, as indicated, to minimize surface damage in the fields.

With the cover 50 removed, the arrangement of structure is best interrelated and the debris exit endless driven conveyor 24 (fifth conveyor from the front of the harvester 11) is seen protruding from the rear of the harvester 11 and it is appreciated that it forms a moving floor for the debris tunnel 51 beneath the cover 50. The substantially horizontal endless openwork conveyor 22 (fourth conveyor from front of harvester 11) runs beneath the conveyor 24 for a short distance rearwardly to deposit singulated fruit on the fruit delivery conveyor 26. The conveyor 22 runs on drive chain 68 which is sprocket driven via an hydraulic motor 53 (not visible in FIG. 3) and the standard hollow pin roller chain 16 carries rods in spaced-apart relation which provide the preferred form of the openwork substantially horizontal bed using three-sixteenths inch diameter rods on about five-eighths inch centers. The fans or blowers 21 extend across and beneath the bed of conveyor 22 and slightly in front of the driven double-bladed hedgers 48 and 49 which are spaced above the horizontal bed 47 of the conveyor 22. The short flighted conveyor 23 (third conveyor from the front of harvester 11) extends over the leading end of the openwork conveyor 22 and is at an incline (FIG. 2) and spaced-apart from the conveyor 23 by an interval allowing the canted blower 20 (hidden edge for emission orifice) to be located. The large endless flighted lift conveyor 29 (second conveyor from the front of harvester 11) is generally parallel to the conveyor 23 and in spaced overlying relationship, as shown. This permits canted forward blower 20 to be positioned between the conveyors 23 and 29 in providing an airflow generally directed upwardly and rearwardly of the harvester 11 and into the tunnel 51 covering the upper portion of the conveyor 29 and the cover 50 extending rearwardly over the third to sixth conveyors, the latter flowing transversely of the conveyor 22 and all other conveyors. The hydraulic cylinder 40 which elevates the entire front section of the harvester 11 is not visible in FIG. 3. The air cylinder 38 forming the sensing cushion for the hinged shoe 34 and the double-bladed mowing hedger 70 and the smooth-faced endless conveyor 35 (first conveyor at front of harvester 11) is seen drivably connected to the chassis via the extensions 36 through the bar 37 and to the assemblage of the foregoing front parts including the Hume type sweep or reel 33 all operably mounted on the L-shaped frame 27 pivotal over the axis of 28. Connection of the cylinder 38 to L-frame 27 is at upper bar 39 connecting the pair of L-frame members 27 which straddle the conveyor 35. This straddle-like support allows limited differential vertical movement at each side of the shoe 34 important in adjusting to minor variations in ground level from one side of the path of the harvester 11 to the other. The powered Hume type reel 33 includes a plurality of tines 71 on its cross connecting elements 72 on radial arms 73 and tines 71 are in spaced-apart relation across the connector elements 72. As is well known, the tines 71 always depend vertically in this type of device through all attitudes of rotation of the reel 33 and in the harvester 11 provides a gentle sweeping action for the plants urging them into the hedger 70 and onto the conveyor 35.

The hedgers 47, 48 and 70 are all double-bladed so that both the upper and lower blades are moving and driven in respect to each other from an oscillating drive, preferably hydraulic, but other modes of power are contemplated as within the scope of the present invention. In the FIG. 3A the fragmental plan view is characteristic of all of the shears or hedgers 47, 48 and 70. The upper blade 74 moves in one direction while the lower blade 75 moves in the opposite direction. The interval pins 76 in guide slots 77 prevent blade separation and the teeth 78 and 79 are hardened and ground, the tips of the teeth 78 and 79 being preferred as blunted. By simultaneous oscillating of the blades 74 and 75, excellent shearing of connective stems and tendrils is obtained and any fruit juices, fragments or debris do not build up on the blades 74 and 75.

As indicated in the FIG. 2, the set angle of the hedgers 48, 49 and 70 tilt the teeth 78 and 79 downwardly between about 10 degrees and about 30 degrees from horizontal to achieve best results.

In FIG. 4 a typical strawberry plant 80 of the Midway II variety is shown isolated from its adjacent and substantially identically vertically growing plants. The flowers (earlier) are generally presented upwardly in the foliage seeking the sunlight and eventually becoming fruit at the ends of the fruit tendrils and stems 81. As the fruit ripens, the berries sink into the foliage in singles and clusters as seen. The tendrils or stems 81 extend from the fruit supporting peduncles 82 in clusters, as shown. Maturation of the fruit varies on the same peduncle 82 and even in the same cluster. The peduncles 82 extend separate from leaf support stems 83 and for clarity minimal foliage is indicated. Accordingly, the present invention sets about to mow the plants 80 above the crown 84 and ground 31 at a distance of about five-eighths inches above the crown 84. The phantom line approximates this location and it is here that the hedger 70 shears or mows the plants 80 and this accomplishes a physical separation of peduncles 82 with connected fruit clusters from the foliage above the roots 85 and with the fruit or berries 80' in all stages of ripeness. As previously described, all sheared material is passed rearwardly via the first conveyor to the second flighted conveyor 29 and up into the tunnel 51 formed by hood or cover 50 of the harvester 11. As the sheared materials flow over the top of the conveyor 29 they are met by a blast of air from the first and inclined blower or fan 20. In the schematic representation of the fans or blowers 20 and 21, all are tangential or cross flow blowers designed similarly but the fan housings for the blowers 20 are angled for delivery away from vertical and the broad nozzles or delivery ends 87 are configured, as seen, to fit between and parallel to the second and third conveyors 29 and 23, respectively, and the rearmost blower 20 extends over the fourth or horizontal conveyor 22. These two blowers 20 achieve a first and important aerodynamic separation of fruit 80' and fruit connected materials from foliage and debris and division into a lower rearward trajectory for fruit and into a higher and sustained trajectory for the leaves, trash and low density debris based upon the complementing and paralleling velocities of the two air blasts or streams from the blowers 20. The leaf connected debris is aerodynamically lofted and moves rearwardly through the tunnel 51 formed by the hood or cover 50 of the machine. In instances of matted or closely connected and entertwined materials, these fall onto the surface of the short conveyor 23 in an agitated condition and the trauma of the drop and the air blast disentangles the fruit connected fragments from the leaf connected fragments in the complementary second blast of air from the rearmost blower 20. The plural blowers 20 with their arrangement flanking the short conveyor 23 assure a foliage separation from the fruit and connected tendrils under even the most adverse of field conditions. The impellers or fan blades are on shafts 88 which support the plural cupped blades 89 which extend across the housings 20 and across the width of the harvester 11 as shown in FIG. 3. Interval plates (not shown) are in spaced-apart vertical planes supporting the blades 89 between the ends of the blowers 20 and in the housing of the blowers 20. Air enters the bottom of the blowers 20 and is picked up by the driven blades 89 and blasted out the broad width delivery ends 87 as indicated by the large force arrows. This establishes an upper trajectory for the leaves, debris and disassociated trash which moves generally rearwardly within the contour of the cover 50, and a lower trajectory for fruit, fruit clusters and fruit connected tendrils and the like. This separation is because of utilization of an aerodynamic propulsion of light and heavy materials. The heavier fruit is in the lower and flatter trajectory and the lighter leaves and debris particles free of the fruit is projected higher and further into the tunnel 51.

The conveyor 23 complements the motion and where matted materials flow over the conveyor 29, their fall (under the blast of the first blower 20) to the small conveyor 23 helps disengage additional debris and leafy portions of the harvest. The trajectories are sustained and complemented by the second blower 20 and the fruited materials are gently deposited on the substantially horizontal surface 47 of the openwork conveyor 22 and slightly ahead of the first encountered blower 21 located beneath the surface 47. As thus deposited, the peduncles and tendrils are, for the most part, still attached to the fruit or berries 80'. The air blast from the first blower 21 causes levitation of the fruit 80' above the surface 47 so that stems and connected tendrils stream above the fruit 80' in reaching the hedger 48, previously described. The hedger 48 shears the tendrils that project into its path. The Vector arrows, as shown, indicate highest blower emission velocity at the closest point adjacent the rear of the mouth 90 of the blower 21. This tends to assure maximum lift at the blades of the hedgers 48 and 49 and the lighter appendages assist the levitation of the fruit. At severance, then, the fruit 80' abruptly settles back onto the moving surface 47. The spaced-apart rods 69 forming the openwork surface 47 are schematically shown and the illustrated endless path of the conveyor 22 is appreciated as providing access room for the conveyors 21.

In FIG. 5 the rearward flow of the harvester is continued and the situation evolving at the second and rearmost vertical blower 21 is appreciated. The disposition of the hedger 49 is substantially the same in respect to the rearmost blower 21 as the hedger 48 is positioned in respect to the frontmost vertical blower 21 and the force vectors are substantially similar from both wide mouths 90.

The fruits 80', mostly already singulated (nonclustered), are again levitated above the surface 47 of the conveyor 22 and assisted by airflow so that any elongate tendrils are further abbreviated and any missed clusters are singulated. The debris, as seen, is projected upwardly and rearwardly by the blasts of air from the blowers 21 and into the stream of exiting and flying debris in the tunnel 51. If the debris and trash falls rearward of the blower 21, it falls on the rearwardly moving conveyor 24 which carries the trash out the rear of the harvester 11.

Meanwhile, the fruit 80' is restored to the surface 47 of the conveyor 22 and is continuously deposited on the fruit exit transfer conveyor 26 to be collected in collection containers conveniently carried by the platform 15 of harvester 11.

In FIG. 7 the procedure of singulation by aerodynamic levitation is better appreciated at the double-bladed hedger 48. Clustered fruit 80' is lifted and the shape of fruit, the existence of the connected stems or tendrils, and the nonturbulent controlled vector flow around the cap, provide a complementary reduction of effective specific gravity at a moment before entry into the down-tilted double-bladed cutting hedger 48. After cutting, the specific gravity of the fruit is outside of the air blast and the specific gravity reducing elements (debris) have been sheared away and enter the debris-conducting stream. The fruit 80' drops to the moving surface 47.

In the FIG. 8 the ground contacting lifter shoe 34, which runs across the front face of the harvester 11, is best understood in relation to strawberry plants 80. On about two and one-half inch centers the shoe 34 includes a ground plate 91 having a rear surface heel plate 93 and intermediate these extremes is a lightly arched connective portion 94. A cross frame 95' supports all of the ground plates 91 at the pivot 95 and also carries the front double-bladed mowing hedger 70. The skid bars or lifters 96 flow rearwardly from the toes 92 and over the first relatively horizontal endless driven conveyor 35. A flow cover plate 97 commences at the upper blade of the hedger 70 and extends rearwardly over the gap between shoe 34 and conveyor 35. This guides the harvested plants with the assistance of the Hume type reel 33 onto the conveyor 35 with minimum obstruction. The frame 95, the conveyor 35 and the Hume type reel 33 are all connected to the L-shaped framing 27, best appreciated in FIG. 2. The ground contacting portions of the shoe 34 are adjusted by the cushion of cylinder 38 which poises and counterbalances the forward harvester section 44.

In operation, the harvester 11 has tested well and the flexibility of its drive system and its extension to the harvesting of solid-set strawberries represents a substantial advance minimizing manpower required in the field and in avoidance of plant destruction attending manual assault on the fields. Following harvest, the plants are quick to recover and by the end of the fall, after harvest, the plants are already stabilized and new runners have filled in many bare spots. The cycle to harvest in the next year is in motion when the harvester 11 leaves the fields and grooming is minimized.

While hydraulic actuation has been favored, electrical drives are possible and combinations of electrical, mechanical, hydraulic and pneumatic means may be used without departure from the spirit of the invention. The various components may be modified and adjusted as to speed and performance and such modifications are regarded as within the spirit of the invention. The slight upward incline rearwardly of the horizontal openwork conveyor 22 was found advantageous and is a design factor indicating that the term "horizontal" is to be considered as "substantially horizontal" with reasonable deviation, as indicated.

Having thus described our invention, the method of harvesting and the harvester in its preferred form, those skilled in the art will appreciate improvement, changes and modifications in the invention thus described and such improvements, changes and modifications are intended to be included herein, liimited only by the scope of our hereinafter appended claims.

We claim:

1. A harvester structure for the singulation of fruits from connective stems and separation from debris, comprising:
    a moving openwork substantially horizontal bed conveyor;
    a plurality of blowers beneath said conveyor in spaced-apart intervals and extending and raising said fruit above said conveyor across said moving bed;
    a double-bladed hedger positioned selectively above and horizontally across said conveyor and positioned slightly downstream of the position of each of said blowers in respect to movement of said conveyor; and
    debris removing means behind the most downstream of said double hedgers.

2. A harvester structure for the singulation of fruits from connective stems and separation from debris, comprising:
    a pair of spaced-apart blowers acting on gravity released harvest materials for aerodynamic separation of foliage and leaves from fruit with connective stems and tendrils and forming a pair of trajectories, one of said blowers for low specific gravity debris as trash and leaves and the other of said blowers complementing said one blower and sustaining a trajectory for the higher specific gravity fruits and their connective stems and tendrils;
    a moving openwork bed substantially horizontal conveyor in the path of said trajectory for higher specific gravity fruits and their connective stems and tendrils;
    a plurality of blowers beneath and extending across said openwork bed and substantially at the foot of the trajectory of fruit projected by said first spaced-apart pair of said blowers;
    a double-bladed hedger above said horizontal openwork bed conveyor and on the downstream side of each of said blowers and at a level above the height of said fruit and said blowers erecting said fruit with connective stems and tendrils and levitating said fruit to present said stems and tendrils to said hedgers;
    a trash receiving means above said hedgers and in the airstream of air exiting from said harvester; and
    a fruit delivery station at the end of said substantially horizontal openwork conveyor onto which said fruit is removed.

3. A harvester structure for solid-set fruits comprising:
    a wheel mounted steerable chassis;
    drive means and transmission means supported on said chassis drivably connected to propel said chassis and provide power to operate selected structure supported by said chassis;
    a front section having an L-shaped frame, a controllable ground contacting and hinged lift shoe, a driven reel above said shoe, a double-bladed hedger adjustable to a selected distance above ground surface and over which said reel functions, a first and endless conveyor behind said hedger, a second conveyor of the lift flight type pivotally connected to said L-frame to receive and lift the discharge from said first conveyor and pivotally connected at its upper end to vertical extensions of said chassis and having gauge means at its lower end, and adjusting means connected to said chassis and to said L-frame whereby said front section is counterbalanced from said second conveyor toward and away from the ground surface;
    a power element between said second conveyor and said chassis providing a lift means for said second conveyor and said front section;
    a third short endless lift type driven conveyor supported by said chassis and generally parallel to said second conveyor and operably beneath the discharge end of said second conveyor;
    a fourth endless driven conveyor supported by said chassis having an open gapped horizontal upper surface;
    a pair of double-bladed driven hedgers supported across said fourth conveyor in spaced-apart horizontal relation to each other and above said horizontal upper surface of said fourth conveyor;
    a fifth endless driven and discharge conveyor rearward of the rearmost of said hedgers and passing debris outwardly and rearwardly of said harvester;
    a sixth endless driven transfer conveyor beneath the rearward discharge end of said fourth and flat bed conveyor and carrying off singulated fruit;
    a cover over said chassis and a portion at the top of said second, all of said third, fourth and fifth conveyors and forming with said conveyors a tunnel thereover directing air from said blowers and debris from said conveyors out of said harvester; and drive transmission means operably connected to said hedgers, said conveyors, said blowers, said adjustment means for said front section, and said power element between said second conveyor and said chassis.

4. A procedure for harvesting a solid-set field of ripened fruit where the fruit tendrils and the foliage tendrils rise separately from the crown of each plant on a levelled, drained field, comprising the steps of:

running a self-powered harvestor over the solid-set fields and lifting the plants into a mower element carried by a ground contacting and counterweighted lifting shoe;

conveying the harvested fruit and foliage through a first aerodynamic separation of fruit connected material and leaf connected material whereby a high trajectory moves away the foliage and a low trajectory is followed by the heavier fruit, their tendrils and clusters;

conveying the fruit and its connected tendrils through a levitation which orients the connected tendrils and fruit vertically above a moving surface; and singulating said fruit while under levitation and cropping by hedger blade shearing said connective tendrils and returning said singulated fruit to said moving surface, said clipped tendrils and debris separating under the force of levitation.

5. In the procedure of claim 4 wherein the step of leaf separation from fruit is repeated aerodynamically and where the step of aerodynamic levitation is repeated in signulation of said fruit.

* * * * *